US008650389B1

(12) United States Patent  (10) Patent No.: US 8,650,389 B1
Thornewell et al.  (45) Date of Patent: Feb. 11, 2014

(54) SECURE SOCKETS LAYER PROTOCOL HANDSHAKE MIRRORING

(75) Inventors: Peter Thornewell, Seattle, WA (US); John R. Hughes, Seattle, WA (US)

(73) Assignee: F5 Networks, Inc., Seattle, WA (US)

( * ) Notice: Subject to any disclaimer, the term of this patent is extended or adjusted under 35 U.S.C. 154(b) by 789 days.

(21) Appl. No.: 12/240,940

(22) Filed: Sep. 29, 2008

Related U.S. Application Data

(60) Provisional application No. 60/976,232, filed on Sep. 28, 2007.

(51) Int. Cl.
  *H04L 29/06* (2006.01)
  *H04L 9/32* (2006.01)
  *G06F 15/16* (2006.01)
  *G06F 17/00* (2006.01)

(52) U.S. Cl.
  USPC ............... 713/153; 713/168; 709/227; 726/3; 726/12

(58) Field of Classification Search
  USPC .............. 380/28–30, 255–283; 713/150–167, 713/189–193
  See application file for complete search history.

(56) References Cited

U.S. PATENT DOCUMENTS

| 5,187,706 | A | 2/1993 | Frankel et al. | |
|---|---|---|---|---|
| 5,881,226 | A | 3/1999 | Veneklase | 395/188.01 |
| 6,609,206 | B1 | 8/2003 | Veneklase | 713/202 |
| 6,640,240 | B1 | 10/2003 | Hoffman et al. | 709/203 |
| 6,971,027 | B1 | 11/2005 | Veneklase | 713/201 |
| 7,073,090 | B2 | 7/2006 | Yanai et al. | |
| 7,111,076 | B2 | 9/2006 | Abjanic et al. | |
| 7,116,634 | B1 | 10/2006 | Hanselmann | |
| 7,139,926 | B1 | 11/2006 | Madhav et al. | |
| 7,184,394 | B2 | 2/2007 | Rombeaut et al. | |
| 7,197,661 | B1 | 3/2007 | Reynolds et al. | |
| 7,272,746 | B2 | 9/2007 | Deerman et al. | |
| 7,337,467 | B2 | 2/2008 | Veneklase | 726/5 |
| 7,412,621 | B2 | 8/2008 | Choi | |
| 7,461,290 | B1 | 12/2008 | Reynolds et al. | |
| 7,506,194 | B2 | 3/2009 | Appanna et al. | |
| 7,535,826 | B1 | 5/2009 | Cole et al. | |
| 7,620,040 | B2 | 11/2009 | Bhaskaran | |
| 2002/0169889 | A1 | 11/2002 | Yang et al. | |
| 2002/0176355 | A1 | 11/2002 | Mimms et al. | |
| 2004/0003094 | A1 | 1/2004 | See | |
| 2006/0136724 | A1* | 6/2006 | Takeshima et al. | 713/168 |
| 2007/0038853 | A1 | 2/2007 | Day et al. | 713/153 |
| 2007/0160198 | A1* | 7/2007 | Orsini et al. | 380/28 |
| 2007/0203957 | A1* | 8/2007 | Desai et al. | 707/204 |

OTHER PUBLICATIONS

U.S. Appl. No. 11/420,677, Accessing SSL Connection Data by a Third-Party, May 26, 2006 (40 pages).

(Continued)

*Primary Examiner* — Evans Desrosiers
(74) *Attorney, Agent, or Firm* — LeClairRyan, A Professional Corporation

(57) ABSTRACT

A traffic manager system comprises communications servers, including one or more active and backup servers. At least one of the communications servers mirrors the communications of the other server involving one or more other network devices, including the encrypted communications. At least one backup server obtains a security value associated with the encrypted communications of at least one active server to independently derive the same key. The backup servers use the keys to engage in the encrypted communications when the active servers become unavailable, for example, without requiring the backup server to reinitiate the encrypted communications.

15 Claims, 11 Drawing Sheets

(56) References Cited

OTHER PUBLICATIONS

Microsoft Corporation, "Compress" "Decompress" "SSL" "Proxy", Microsoft Computer Dictionary, 7 pages, 2002, 5th Edition, Microsoft Press.

F5 Networks "Configuring a Redundant System," BIG-IP Reference Guide, 2002, pp. 1-20, Chapter 13, Version 4.5, F5 Networks, Inc., USA.

Null et al., "The Essentials of Computer Organization and Architecture," Jones and Bartlett Computer Science, 2003, pp. 521-524, 538-548.

Rescoria et al., "SSLACC: A Clustered SSL Accelerator," Proceedings of the 11th USENIX Security Symposium, 2001, pp. 1-18, San Francisco, CA.

* cited by examiner (BACKGROUND)

SECURE SOCKETS LAYER PROTOCOL HANDSHAKE MIRRORING

CROSS-REFERENCE TO RELATED APPLICATIONS

This application claims the benefit of U.S. Provisional Patent Application No. 60/976,232, filed Sep. 28, 2007, the content of which is hereby incorporated by reference herein in its entirety. This application is also related to U.S. patent application Ser. No. 11/420,677, filed May 26, 2006, and U.S. Provisional Application No. 60/785,151, filed Mar. 23, 2006, the contents of which are also hereby incorporated by reference herein in their entireties.

BACKGROUND

Unfortunately, in both public and private data networks, it is not unusual for a data communications transaction to be dropped. For example, a transaction may be lost because a communication device, such as a traffic manager, fails. This may not a serious problem for some data communications. Some networks include redundancy to account for these types of problems such that, when a device fails, the traffic previously routed through the failed device can be rerouted through the redundant system or systems. To protect against lost of such transactions, some networks may employ standby or backup devices that continuously mirror each other's communication operations. Using such mirroring, when an active device fails, the traffic can be immediately routed through the backup device that, because it has been mirroring the communications, can continue managing the transaction from the point at which the active system failed. For example, transmission control protocol (TCP) transactions can be successfully mirrored with device mirroring so that devices may fail without disrupting any transactions.

Transaction mirroring, however, does not work in all contexts. For example, transaction mirroring does not work with secure sockets layer (SSL) protocol. Using SSL, a client and a communications server perform a handshake in which a secret or symmetrical key is created for the session. The secret is securely transmitted from the server to the client using public key infrastructure (PKI) to encrypt the secret. The secret is then used by both the communications server to encrypt and decrypt communications between the client and server throughout the balance of the transaction. The secret is based on a value, such as a randomly-generated number, to provide a reasonable level of security for the transaction with relatively low encryption overhead as compared to using PKI throughout the transaction.

Unfortunately, for example, if the communications server fails in the midst of an SSL transaction, the transaction will be lost. The secret is shared by only the communications server and the client; if the communications server fails, the secret, in effect, dies with the communications server. Without the key, another communications server cannot take over and continue the session because, without the key, the encrypted communication will not be comprehensible.

SUMMARY

According to one embodiment, a plurality of communications servers, including an active communications server and at least one backup communications servers, are operably coupled. The communications servers are configured to conduct encrypted communications with at least one network device using a key derived from a security value. The communications servers are configured to derive a same key from a same security value, and the at least one backup communications server is configured to mirror the encrypted communications with at least one network device. The same security value is provided to the communications servers from which the communications servers derive the same key. Secure communications are conducted with the at least one network device, at least initially using the active communications server. Upon the active communications server is unable to continue conducting secure communications with the at least one client, the at least one backup communications server continues conducting the secure communications with the at least one network device.

According to another embodiment, a system includes a security value source configured to output a plurality of security values. A key is derivable from each security value. A plurality of communications servers are configured to receive one of the plurality of security values, derive the key from the security value, and share the key with at least one network device to facilitate secure communications. The key allows encrypted and decrypted communications between the communication server and the at least one network device. The plurality of communications servers are also configured to do one of operate as an active server to conduct secure communications with the at least one network device using the key and a security protocol, and operate as a backup server and mirror the secure communications between the active server and with the at least one network device using the key, such that the backup server will continue the secure communications with the at least one network device upon the active server becoming unable to continue the secure communications with the at least one network device.

According to yet another embodiment, a method includes providing a security value to a plurality of communications servers, including an active server and at least one backup server. The communications servers are configured to conduct secure communications with at least one network device based on the security value. The active server is operably coupled with the at least one backup server to allow the at least one backup server to mirror the secure communications between the at least one active server and the at least one network device such that the secure communications are mirrored based on the security value. A secure transaction is initiated between the active server and the at least one network device. The secure transaction is continued between the active server and the at least one network device. The secure transaction continues with the at least one network device through the at least one backup server upon the active server becoming unable to continue the secure transaction with the at least one network device.

According to a further embodiment, a computer-readable storage medium has a set of instructions for execution on a computer. The set of instructions comprising providing a same security value to a plurality of communications servers that include an active server and a backup server. The active server is communicatively coupling with the backup server so that the backup server is configured to mirror secure communications between the active server and a network device. The secure communications are mirrored based on the same security value. A secure transaction is initiated between the active server and the network device. The secure transaction is continued with the network device through the backup server upon the active server becoming unable to continue the secure transaction with the network device.

According to another embodiment, a traffic management apparatus comprises a memory for storing a set of computer executable instructions, network interface configured to receive encrypted network traffic, and a processor configured to execute the set of stored computer executable instructions. The set of instructions includes receiving a security value from a value source coupled to the traffic management apparatus, a first network device, and a second network device. The instructions also include deriving a key from the security value and sharing the key with the first network device and the second network device. The shared key is configured to facilitate secure communications between the first network device and the second network device. The instructions further include mirroring the secure communications between the first network device and the second network device based on the shared key. The instructions then include continuing secure communications between the second network device and the traffic management apparatus upon the first network device becoming unable to continue secure communications with the second network device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit of a three-digit reference number or the two left-most digits of a four-digit reference number identify the FIGURE in which the reference number first appears. The use of the same reference numbers in different figures indicates similar or identical items.

DETAILED DESCRIPTION

Overview

Implementations of secure sockets layer protocol (SSL) handshake mirroring allow for a communications server to be backed up by a standby device that can continue a transaction if the original communications server handling the transaction should fail. The original or active communications server, such as a traffic management device or other communications controller, is operably coupled with one or more backup devices to allow the backup devices to mirror the communications of the active device. According to implementations of the present disclosure, the active device and the one or more backup devices also share a security value, which may be a security key or secret, or a value from which the key will be derived.

Because the active communications server and the backup devices each have the same key (or value from which the parallel devices will generate the same key), the one or more backup devices are able to fully mirror the communications of the active communications server, including using the same encryption. As a result, if the active communications server should fail, one of the backup devices, in possession of the same key used by the active communications server, can continue the transaction after the active communications server has failed.

Possible Operating Environment for Handshake Mirroring

Figure 1:
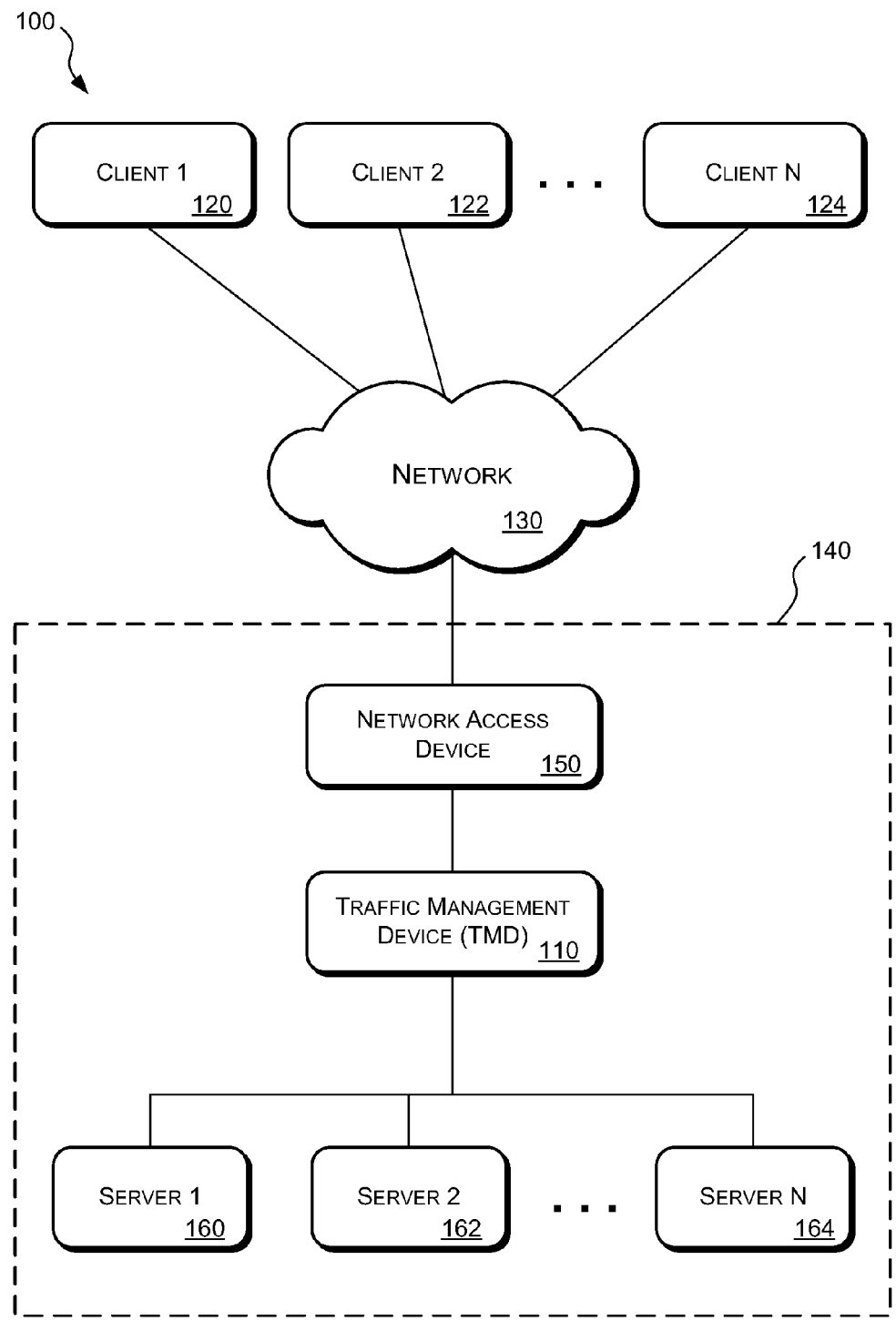
FIG. 1 is a block diagram representing an exemplary operating environment in which a traffic management device initiates and conducts secure communications with clients over a network.

FIG. 1 illustrates an exemplary operating environment 100 of a communications server, such as a traffic management device 110, supporting an implementation of the present disclosure. In the exemplary operating environment 100, a plurality of clients, including client 1 120, client 2 122, through client N 124, seek services provided by a plurality of servers, including server 1 160, server 2 162, through server N 164. The clients 120-124 are in communication with a network 130, which may include a public network, such as an Internet, or a private network, such as a dedicated network or a virtual private network. Within the network 130, a domain name server or other routing system (not shown) identifies a resource location 140, which may include a server, a server pool, a virtual server, or another type of resource location sought by the clients 120-124.

At the resource location 140, incoming communications may be received by a network access device 150, such as a router or other switching device, which operably couples the resource location 140 with the network 130. The traffic management device 110, or "TMD," is a communications server that receives client requests from the network 130 via the network access device. The client requests include requests for services provided by one or more of the servers 160-164. The traffic management device 110 then directs the client requests to one of the servers 160-164.

The exemplary operating environment of FIG. 1 illustrates just one example of an operating environment in which implementations of the present disclosure may be used. For example, the network access device 150 also may utilize implementations according to the present disclosure, or the servers 160-164 may handle their own network access and/or traffic management functions. For another example, the traffic management device 110 may direct traffic to destinations other than servers, including other server farms, communication systems, or other destinations. Further, and as described below, the environment 100 may include multiple traffic management devices 110 that may share one or more common tables used in the management of network traffic for load balancing and/or to provide redundancy to backup a failing traffic management device.

The following descriptions and examples are directed to the use of implementations of the present disclosure in association with a plurality of parallel traffic management devices. However, this disclosure is not limited to be used only with parallel traffic management devices.

Figure 2:
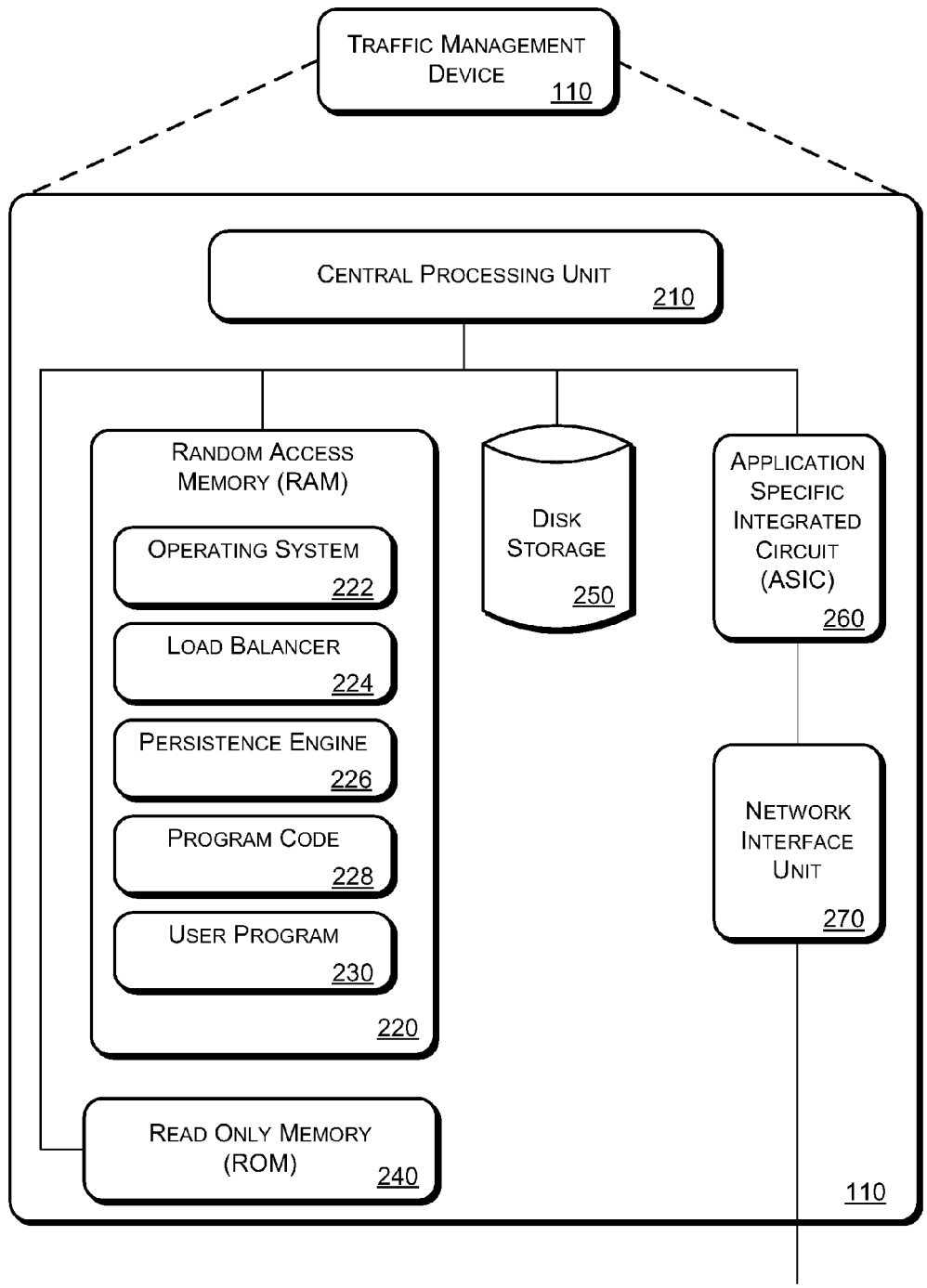
FIG. 2 is a block diagram of the traffic management device shown in FIG. 1.

FIG. 2 is a block diagram of an exemplary implementation of a traffic management device 110 as shown in FIG. 1 that may be used with implementations of the present disclosure. The traffic management device 110 of FIG. 2 is a computing system combining both hardware and software components. In other words, the traffic management device of FIG. 2 can be regarded a computing system configured to perform some functions in hardware and others by executing software instructions stored in memory locations.

Specifically, the traffic management device 110 of FIG. 2 includes six general components: a central processing unit 210, random access memory (RAM) 220, read-only memory (ROM) 240, disk storage 250, application specific integrated circuits (ASICs) 260, and a network interface unit 270. The central processing unit 210 is configured to execute instructions stored in the random access memory 220 or the read-only memory 240 to execute the functions of the traffic management device. The random access memory 220 includes a volatile or non-volatile memory system that stores a plurality of programs and/or data retrievable from disk storage 250 or otherwise provided to the random access memory 220.

The random access memory 220 stores programs or sets of instructions that include an operating system 222, a load balancer 224, a persistence engine 226, program code 228, and user programs 230. The operating system 222 facilitates the overall function of the traffic management device 100, including managing how the traffic management device 110 interfaces with internal and external devices and processes various programs. The load balancer 224, implementations of which are described below, distributes client requests for services to different resources, such as servers 160-164 (FIG. 1) with which the traffic management device 110 is associated to balance the workload among those resources. The persistence engine 226 directs clients requests already serviced by one of the servers 160-164 or are otherwise are to be directed to a designated server. The program code 228 and user program 230 facilitate other functions, such as monitoring the operation of the traffic management device 110 or other functions supported by the provider of the traffic management device 110 or created by a user of the traffic management device 110, respectively.

The read-only memory 240 stores instructions including startup routines and other device-specific functions based on the architecture of the traffic management device 110. The disk storage 250 stores programs and data that will be retrieved into or stored from the random access memory 220. One or more application specific integrated circuits 260 are configured to implement various data communications or frequently used functions in hardware. The network interface unit 270 provides the connections and control logic to receive and transmit data communications over a network and/or to a plurality of associated resources.

Although the traffic management device 110 of FIG. 2 is described as a combined hardware and software system, implementations of the present disclosure may be used with traffic management devices that are implemented in hardware, software, or some combination of both. For example, the traffic management device 110 may include a plurality of scalable components, including one or more switching components and one or more control components. For one example, the switching components in such an implementation may be exclusively hardware components that receive incoming data packets or other data events and, based on information associated with the data events, access tables to identify a destination to which the data events should be routed. If it is determined that a data event is not already associated with a destination, the switching component may direct the data event to a control component to determine a destination to which the data event should be routed. Regardless of how the switch component is implemented, the control component may be implemented in hardware, software, or a combination of hardware and software.

Benefits and Limitations of Using Multiple Communications Servers

Figure 3:
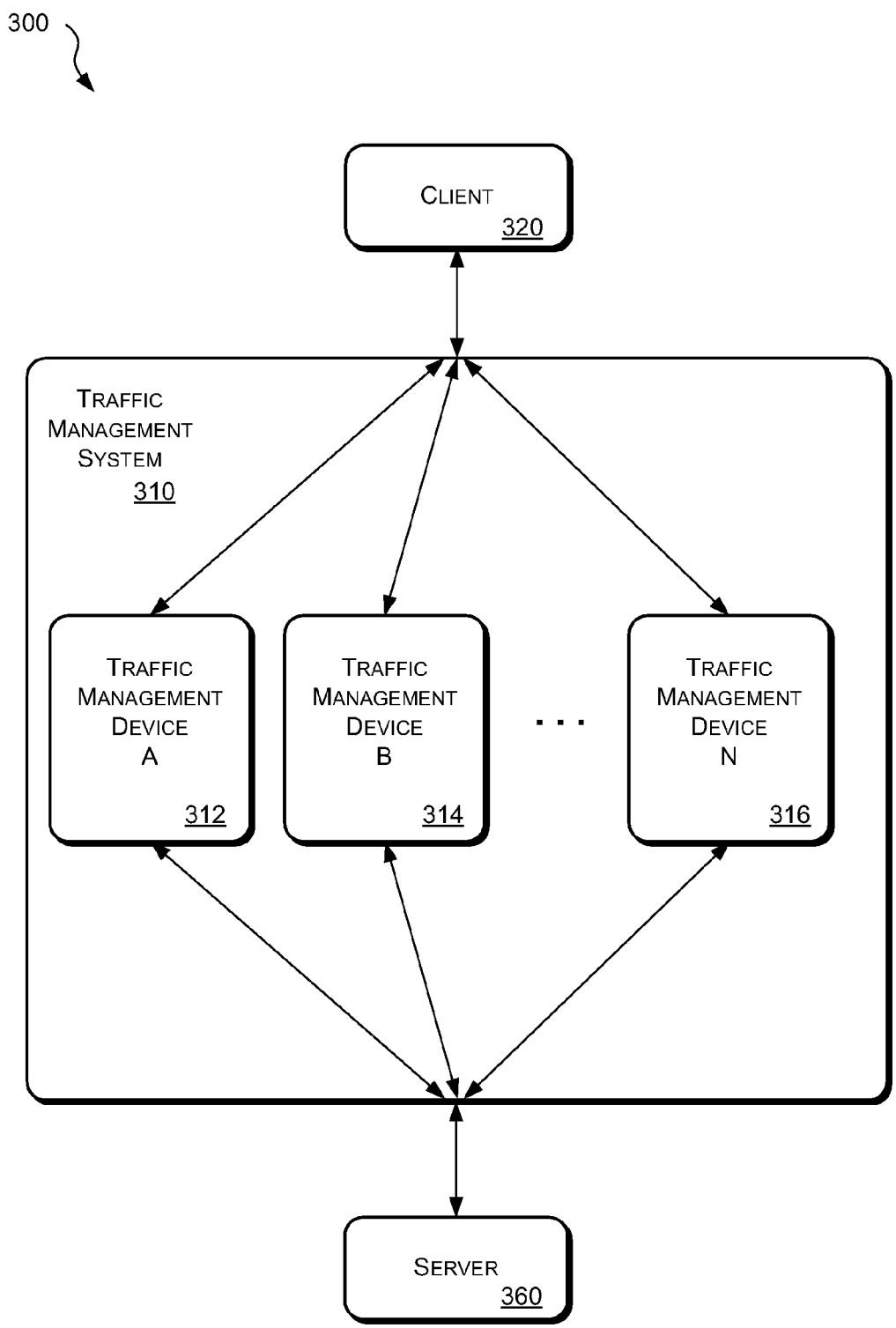
FIG. 3 is a block diagram of a traffic management system employing multiple traffic management devices to facilitate communications between a client and a server.

FIG. 3 illustrates a network environment 300 in which a traffic management system 310, including a plurality of traffic management devices 312-316 or communications servers, are used to manage network traffic between clients and servers. For purposes of simplicity in illustration, however, only a single client 320 and a single server 360 are shown in FIG. 3.

A traffic management system 310 employing multiple traffic management devices, including traffic management device A 312, traffic management device B 314, and traffic management device N 316, provides benefits that may not be provided by a single traffic management device. For example, when network traffic suddenly increases, a traffic management device, such as traffic management device A 312 may find it is overloaded with client requests and/or server responses. However, when other, parallel communications servers, such as traffic management device B 314 through traffic management device N 316, are available, the overload of network traffic can be shared between the traffic management devices 312-316 to maintain the efficiency of the collective traffic management system 310.

Figure 4A:
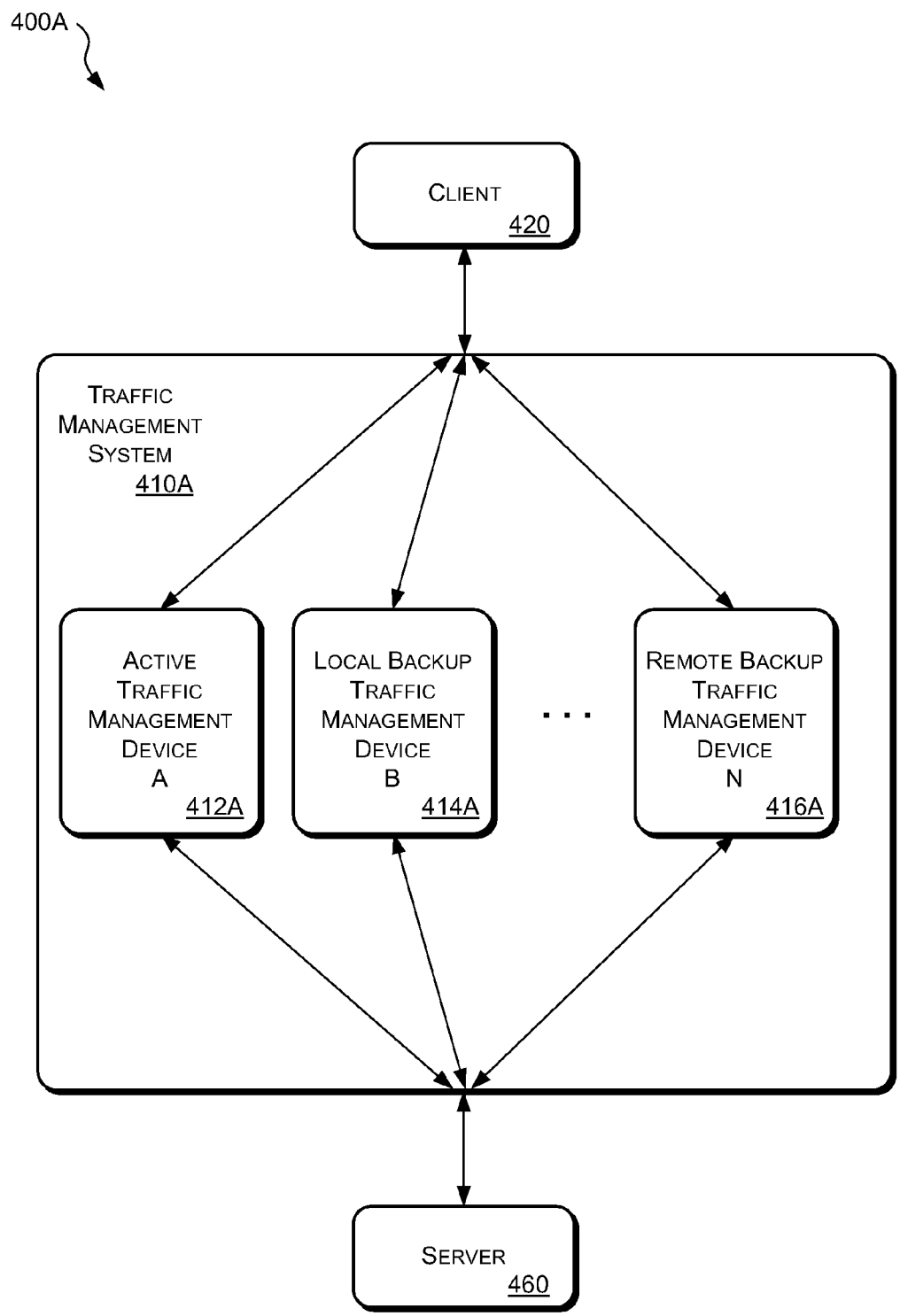
FIG. 4A is a block diagram of the traffic management system of FIG. 3 in which one or more of the traffic management devices provides a backup to an active traffic management device.

As shown in FIG. 4A, using multiple, parallel traffic management devices also may provide beneficial redundancy in the event of device failure. In the network environment 400A, one or more clients 420 are in communication with one or more servers 460 through a traffic management system 410A including multiple traffic management devices 412A-416A. Each of the traffic management devices 412A-416A may provide backup for one or more of the other traffic management devices. If only one traffic management device were used as the traffic management system 410A, and that device failed, all network traffic between the clients 420 and the servers 460 may come to a halt. Thus, it may be desirable to employ multiple communications servers or traffic management devices.

Backup may be implemented in a deployment such as that shown in FIG. 3, where each of the traffic management devices 312-316 is an active device that continually assists in handling network traffic. If one of the traffic management devices should fail, for example, traffic management device A 312, then the load previously managed by traffic management device A 312 could be distributed to traffic management device B 314 through traffic management device N 316. The extra load on the remaining functional traffic management devices 314-316 may slow the performance of those devices, but the traffic management system 310 may be able to continue to handle the full load of network traffic that ordinarily would be handled by a full complement of the traffic management devices 312-316.

Alternatively, instead of redistributing traffic among a plurality of active communications servers or traffic management devices, as shown in the network environment 400A of FIG. 4A, dedicated standby or backup communications servers or traffic management devices may be used to replace an active device when it fails. In the case of the traffic management system 410A, traffic management device A 412A is assigned as the active traffic management device, while one or more other traffic management devices, such as traffic management device B 414A through traffic management device N 416A, are dedicated to backup the active traffic management device A 412A.

The backup traffic management devices 414A through 416A may be local or remote backup devices. In the case of a local backup device, the local traffic management device B 414A might reside in the same equipment rack, data center, or blade-type system. The local traffic management device B 414A stands by, ready to take over the traffic management load of active traffic management device A 412A if active traffic management device A 412A should experience a hardware and/or a software failure and cease to function.

In addition to or in the alternative to a local backup traffic management device, a remote device, such as remote backup traffic management device N 416A may be deployed at another, physical location. For example, if a power failure or similar catastrophe occurred at the site where active traffic management device A 412A resides, that same catastrophe would likely disable local backup traffic management device B 414A and any other local backup devices. Thus, a remote backup device, such as remote backup traffic management device N 416A, deployed at another physical location, may be able to take over the network traffic of active traffic management device A 412A in the event of a large-scale disaster.

To provide backup for transactions that persist over a series of potentially a great many individual requests, mirroring is used to allow one of the backup devices to take over and continue the transactional load handled by a failed device. Using mirroring, a backup device is coupled in parallel with the active device it backs up and processes the same requests as the active device, only the backup device is not actually coupled to the network to communicate with the client. However, if the active device does fail, the backup device can assume control over the transaction and, because the backup device has executed the same functions as the previously active device, the backup device can continue the transaction at the point where the active device failed.

To take one example, mirroring is effective in transmission control protocol (TCP) systems. One or more backup devices can mirror the processing of requests in transactions handled by an active communications server or traffic management device. Thus, taking the example of FIG. 4A, if active traffic management device A 412A should suddenly fail, then there local backup traffic management device B 414A or remote backup traffic management device N 416N could take over the transaction with the next communication. Thus, without having to reinitiate the transaction, one of the backup devices 414A or 416A could step in for the previously active device and continue the transaction from that point.

However, although mirroring works well with some network protocols, it does not work for all protocols. For example, in secure sockets layer (SSL) protocol, if one attempted to employ mirroring to provide backup for SSL transactions in the traffic management system 410A, none of the backup devices would be able to continue a transaction for a failed active communications server.

Figure 4B:
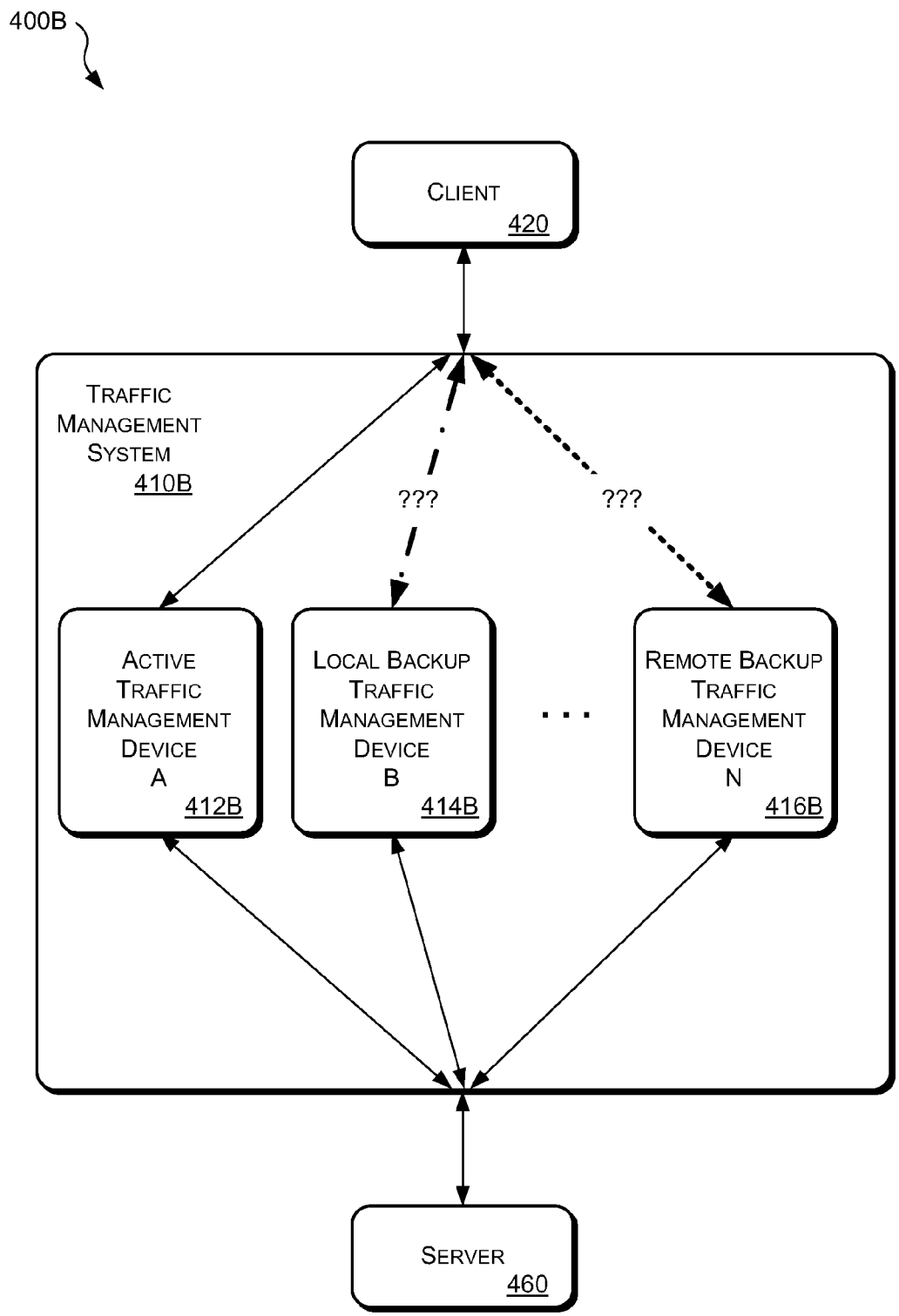
FIG. 4B is a block diagram of the traffic management system of FIG. 4A in which, using secure communications, the one or more backup devices are unable to back up the active traffic management device.

FIG. 4B illustrates a network environment 400B similar to that of the network environment 400A of FIG. 4A except, in the network environment 400B, the clients 420 communicate with the traffic management system 410B using SSL protocol to conduct secured, encrypted communications. Using SSL protocol, the client and the communications server or traffic management device will agree on a symmetrical key or secret to encrypt and decrypt communications between the entities during the course of that transaction. The communications server or traffic management device, for example, may use a random number generator or similar source of changing values to yield a value that will be used for creating the key or serve as the basis for creating the key. Once the key is created, it is presented to the client in a secure communication, such as by using public key infrastructure (PKI) protocol. PKI protocol is generally not used for all of the communications because, particularly as compared with symmetric key encryption, PKI protocol can be much more computing resource intensive.

Unfortunately, as is understood by those ordinarily skilled in SSL protocol, each of the different communications servers or traffic management devices will generate its own key for use in encrypting and decrypting the communications with the client. As a result, each of the traffic management devices 412B-416B in the traffic management system will, essentially, be speaking a different language to the client 420. In other words, in communication with active traffic management device A 412B, the client 420 and the active traffic management device 412B will be in possession of the same key and, thus, will be able to decrypt each other's messages. However, local backup traffic management device B 414B and remote backup traffic management device 416B will have selected different keys or secrets that, if either of them had been involved in initiating the SSL transaction with the client 420, would have communicated their own, different keys to the client 420.

Some of the illustrated embodiments, such as FIGS. 1 and 2, generally show a single traffic management device 110. Other illustrated embodiments, such as FIGS. 3, 4A, and 4B, generally show multiple traffic management devices within a traffic management system 310, 410A, 410B. While multiple traffic management devices within a traffic management system may provide beneficial redundancies, the systems described herein may be implemented through separate traffic management devices that are not necessarily contained within a traffic management system. For example, it is contemplated that the methods described herein can be implemented on multiple traffic management devices, such as the traffic management device 110 illustrated in FIG. 1 or 2.

Figure 5:
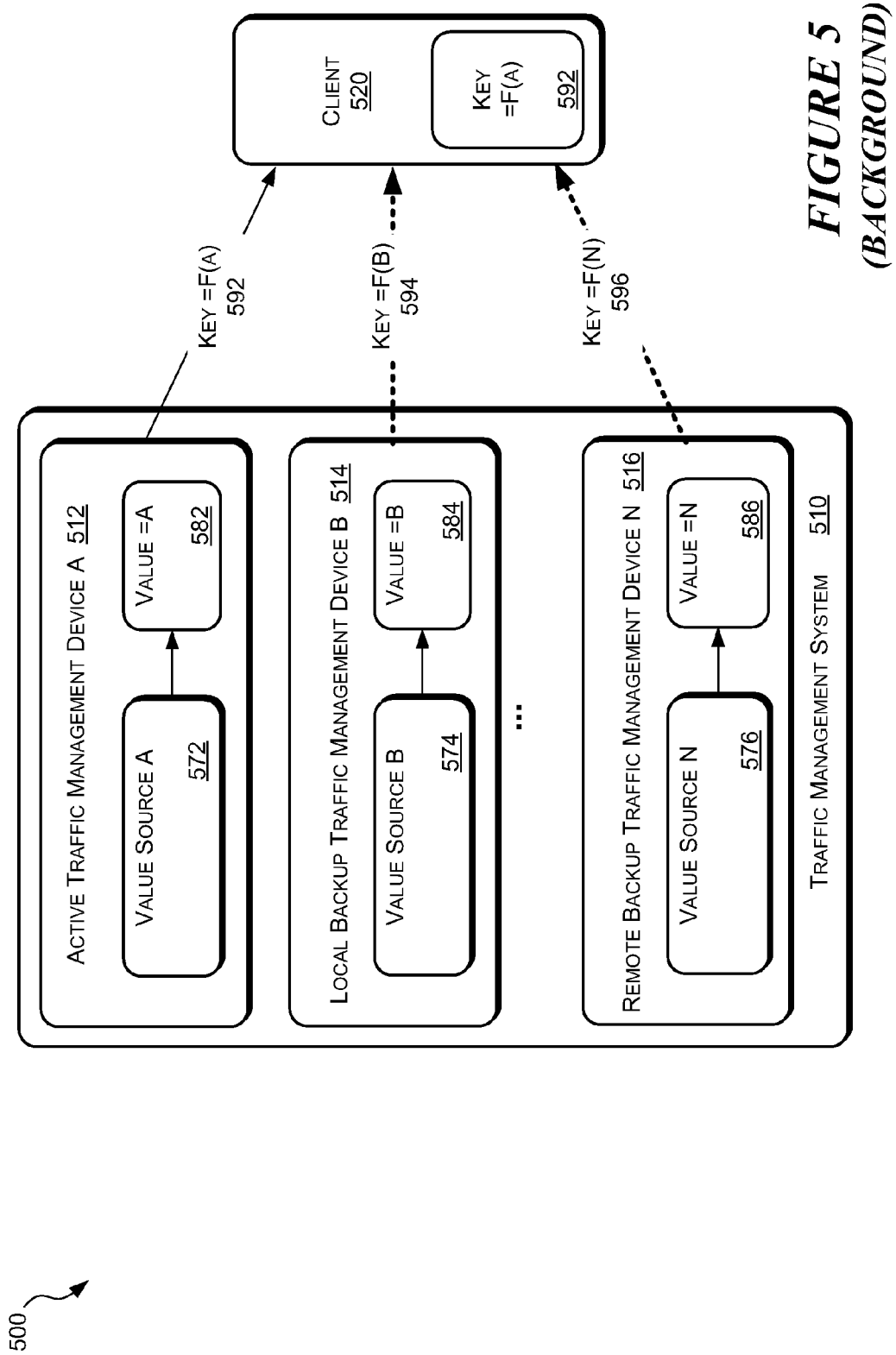
FIG. 5 is a background block diagram figure depicting a detailed version of the traffic management system of FIG. 4B attempting to mirror a secure communication between a client and a server.

FIG. 5 illustrates in more detail the operation of conventional communications servers or traffic management devices operating without the benefit of implementations of the present disclosure. In the network environment 500, a traffic management system 510 includes three traffic management devices 512-516. Each of the traffic management devices 512-516 includes its own respective value source 572-576, each of which generates or presents its own, individual respective value 582-586 which would serve as or be used to create the symmetrical key to be used in SSL communications between that communications server and the client.

In the network environment 500, active traffic management device A 512 uses value source A 572 to generate or otherwise present the value A 582 to create a symmetric key to conduct an SSL transaction with the client. Because it is the active communications server, active traffic management device A 512 communicates its key, the key 592 being some function of A, to the client 520. The client 520 retains the key 592 for use during the course of the transaction.

Seeking to mirror the transaction between the client 520 and active traffic management device A 512, upon initiating an SSL handshake, the backup traffic management devices 514 and 516 will seek to generate their own keys to communicate with the client. Local backup traffic management device B 514, using its own value source B 574, will generate value B 584, for which the key will be a function of B 594. Remote backup traffic management device C 516, using its own value source C 576, will generate value C 586, for which the key will be a function of B 594. Unfortunately, the resulting keys 594 and 596 will not be the same as the key 592 received and used by the client 520. Thus, if active traffic management device A 512 fails, the backup traffic management devices 514 and 516 will not be able to continue the transaction that active traffic management device A 512 initiated. The client 520 will have to reinitiate and process the transaction from the beginning with the hope that the aborted transaction does not hamper or prevent the re-execution of the transaction.

Figure 6:
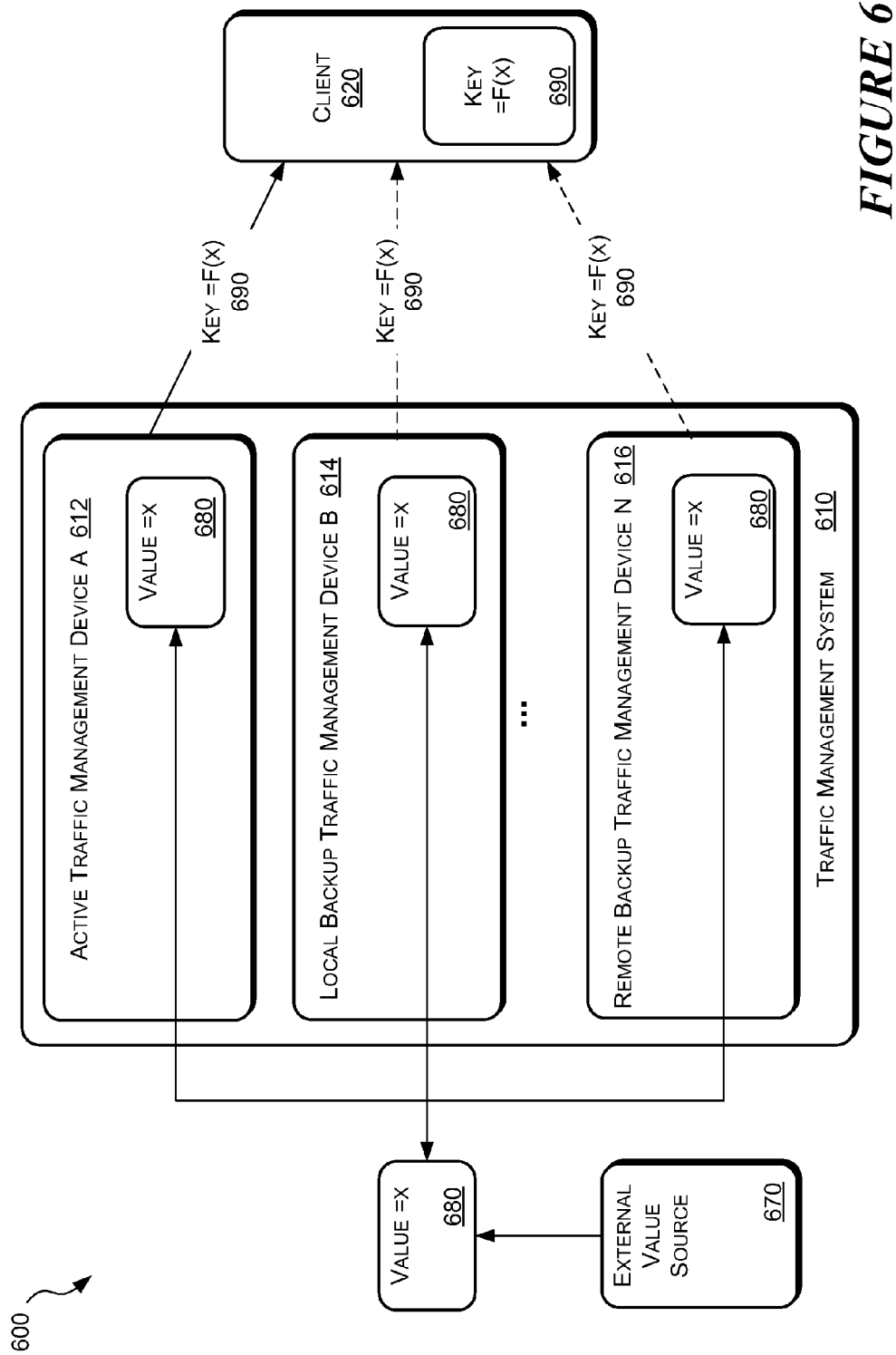
FIGS. 6, 7A, and 7B are block diagrams of implementations of the present disclosure in which the traffic management devices access a common security value to use in conducting secure communications.
Figure 7A:
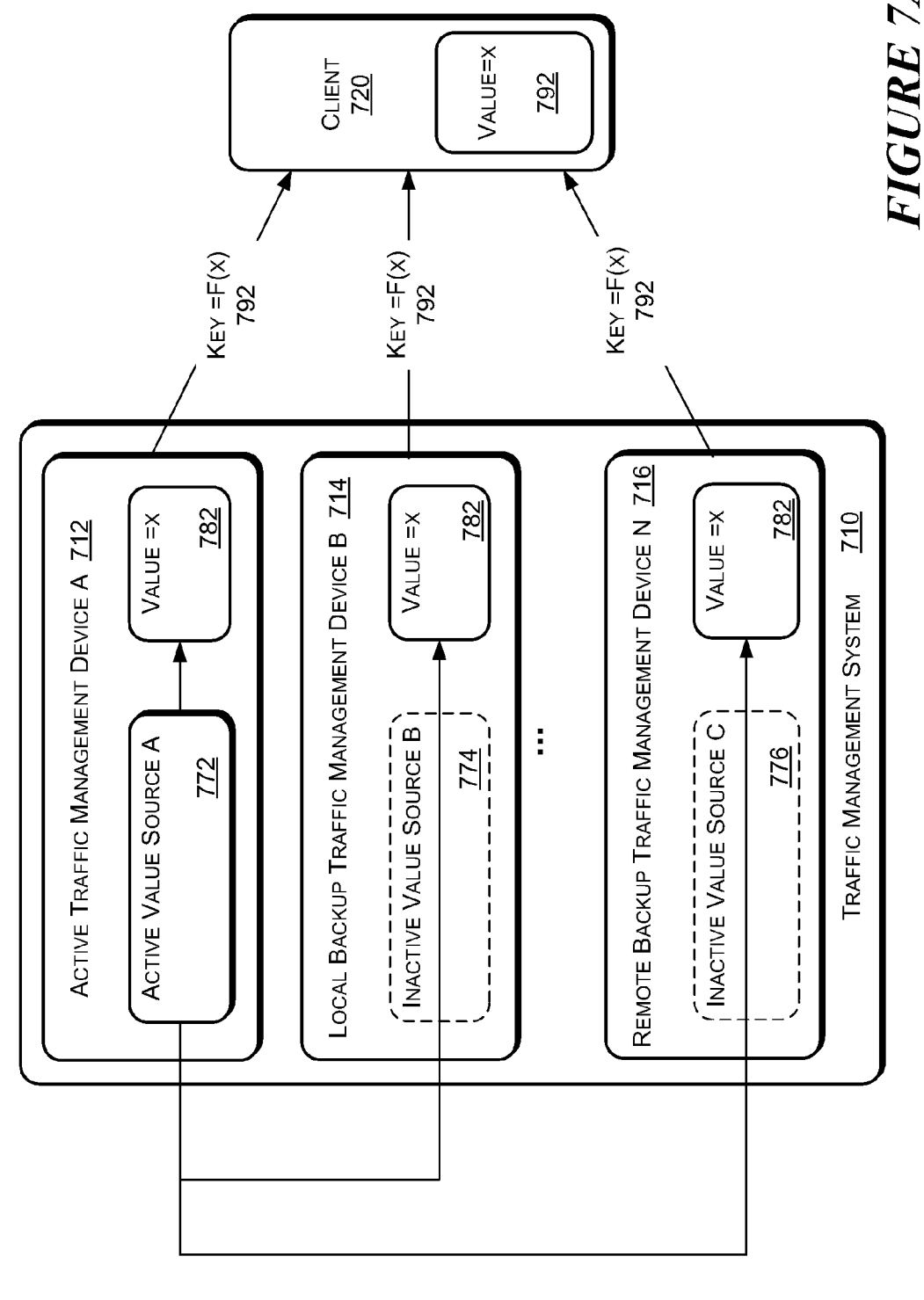
Figure 7B:
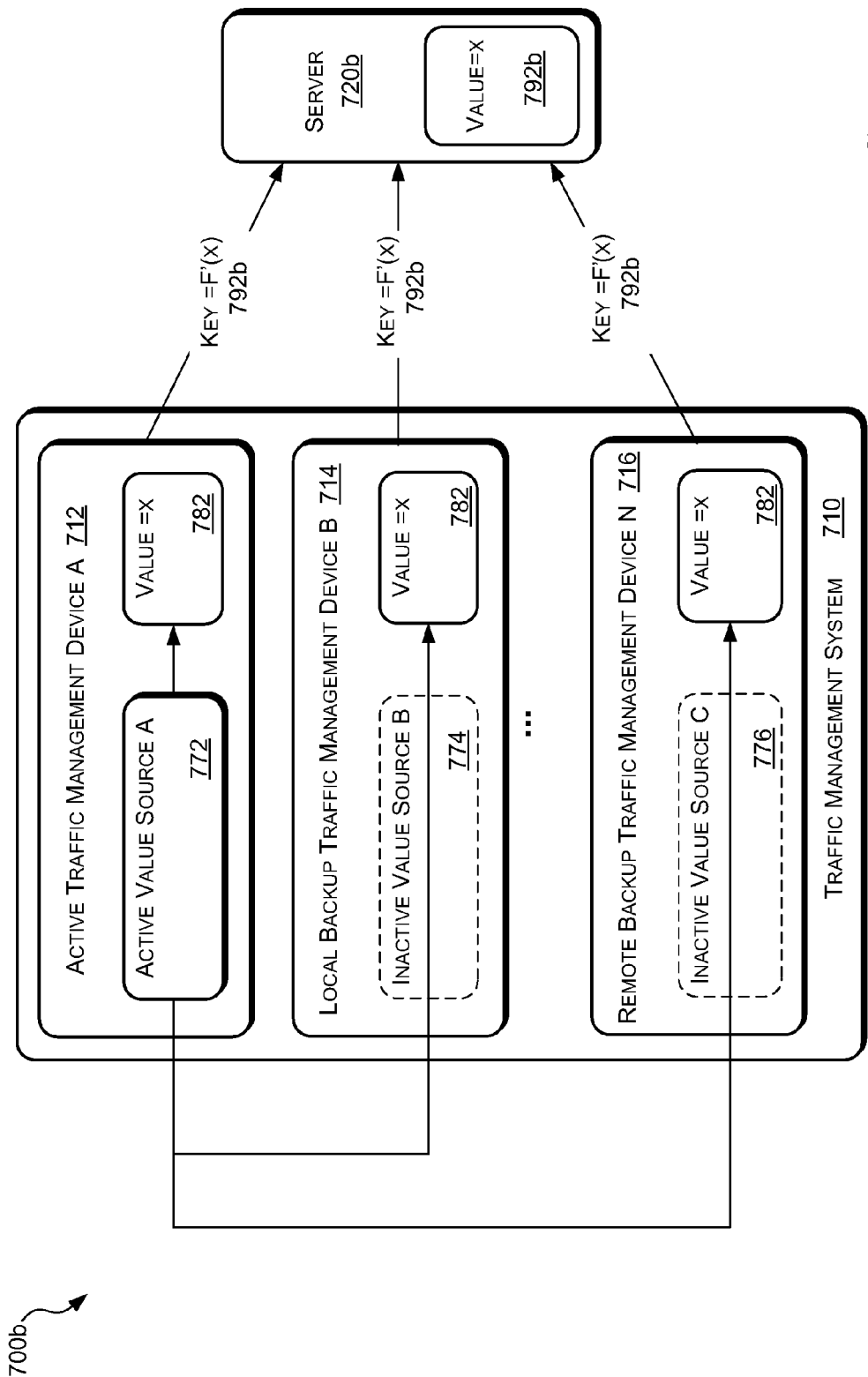

FIGS. 6, 7A, and 7B illustrate alternative implementations of handshake mirroring according to implementations of the present disclosure. As previously described, SSL mirroring between multiple communications servers or traffic management devices fails because the active device and backup device or devices will generate or otherwise identify different security values that form or result in different keys. However, if the active device and the backup device or devices each used the same security value to serve as the basis for its key, then the active device and the backup device or devices would use the same key. With the same key, the backup device or devices would be able to encrypt and decrypt secure communications exchanged with the client. Thus, if the active device should fail, the backup device or devices would be able to continue the transaction from the point at which the active device failed.

FIG. 6 shows a network environment using one implementation according to the present disclosure to facilitate SSL handshake mirroring to allow for device backup in SSL transactions. A traffic management system 610 includes multiple communications servers or traffic management devices 612-616, including active traffic management device A 612 and backup devices including local backup traffic management device B 614 and remote backup traffic management device N 616. As compared to the traffic management devices 512-516 of FIG. 5, the traffic management devices 612-616 rely on an external value source 670. The traffic management devices 612-616 may physically incorporate their own value sources, but the sources may be disabled in favor of using the external value source 670.

Upon initiating an SSL transaction with a client 620 or other network device, such as, for example, a server 720b shown in FIG. 7B, the active traffic management device 612 will seek a value from the external value source 670 which, for example, presents value x 680. In contrast to the example of FIG. 5, however, the value x 680 presented by the external value source 670 is presented not only to active traffic management device A 612, but is also presented to local backup traffic management device B 614 and remote backup traffic management device N 616. Because each of the traffic management devices 612-616 receives the same value x 680, each generates the same key as a function of x 690.

As in the example of FIG. 5, active traffic management device A 612, as the active device, will present the key as a function of x 690 to the client 620 for use during the course of the transaction. However, in contrast to the example of FIG. 5, if active traffic management device A 612 should now fail, the backup traffic management devices 614 and 616 hold the same key 690 that active traffic management device A 612 presented to the client during the SSL handshake.

In other words, because both backup traffic management devices 614 and 616 received the same value x 680 as did active traffic management device A 612, the backup traffic management devices 614 and 616 can mirror the same SSL handshake as was executed between active traffic management device A 612 and the client 620. In mirroring the handshake, both backup devices 614 and 616 are in possession of the same key 690 as was set to be used in the transaction between active traffic management device A 612 and the client 620. Thus, if active traffic management device A 612 should fail during the course of the transaction, the backup devices 614 and 616 will be able to continue the transaction at the same point and using the same encryption.

FIG. 7A depicts a network environment 700 using an alternative implementation of the present disclosure. The traffic management system 710 again includes active traffic management device A 712 and backup traffic management devices 714 through 716. The traffic management devices support their own respective value sources 772 through 776, as was described with reference to FIG. 5. However, in the traffic management system 710, the traffic management devices 712-716 do not rely on their own value sources 772-776 or an external value source as in the example of FIG. 6.

In the traffic management system 710, the traffic management devices 712-716 all rely on the value source of one selected traffic management device. As a result, the traffic management devices all will rely on the same value and hold the same key to communicate with the client. Specifically, in the example of FIG. 7A, the traffic management devices 712-716 will use value source A 772 of active traffic management device A 712 as the active value source. Active traffic management device A 712 receives its own value x 782 from its own value source 772. However, in this implementation, the other traffic management devices 714 and 716 will disable or disregard their own value sources 774 and 776, rendering them inactive, and receive the same value x 782 from active value source A 772.

As in the example of FIG. 6, each of the traffic management devices 712-716 will derive its key from the same value x 782 and, thus, derive the same key as a function of x 792a. Active traffic management device A 712 will communicate the key 792a to the client 720, or other network device (e.g., a server), for use throughout the rest of the transaction. Having received the same value x 782 and thus having mirrored the SSL handshake between active traffic management device 712 and the client, backup traffic management devices 714 and 716 will be able to continue the transaction with the client 720a, or other network device, if the active traffic management device 712 should fail.

Once active traffic management device 712 fails, control will pass to the available backup device or one of the backup devices according to a pre-established sequence of succession. Once active traffic management device 712 fails, presumably active value source A 772 also will have failed, so another value source will be used to generate the security value for the next transaction. In one implementation, the value source of whichever backup traffic management device becomes the active traffic management device will become the active value source. However, any available value source may be selected as the active value source as long as the active traffic management device and its one or more backup devices all recognize the same value source as the active source.

Referring to FIG. 7B, a portion of the illustrated network environment 700b is similar to the portion of the network environment 700a illustrated in FIG. 7A, except FIG. 7B shows the traffic management system 710 communicating with server 720b instead of the client 720, and key 792b is shown instead of key 792. Otherwise, the traffic management system 710 performs the same steps described above in connection with FIG. 6 and/or FIG. 7A except as just described.

In this example, the traffic management system 710 interacts with the server 720b instead of the client 720, including passing control to a backup device 714 or 716 upon failure of the active traffic management device 712 as one example.

It is contemplated that for certain embodiments, such as, for example, FIGS. 6, 7A, and 7B, while the same security value can be provided from the value source, an altered value can be provided, as well. For example, the value source can alter the security value provided to the communications server(s) and network device(s) based on a function known to the device(s) receiving the security value. This is illustrated by the simple example of the value source incrementing the security value by a fixed value and the receiving device (e.g., server, client, or other network device) reducing the security value by the same fixed value so that each of the active and back up devices has the same value.

It should be noted that these descriptions of Implementations of the present disclosure make some presumptions. For example, it is assumed that the communication servers or traffic management devices used will derive the same key from the same presented security value. It is also presumed that the key will be some function of x. However, implementations according to the present disclosure are not limited by these presumptions.

For example, the key may not be derived from the security value; instead, the value may be used as the key. Alternatively, the key may be derived from the security value by extracting a portion of the value or by applying a hashing function or some other operation to the value. Alternatively, when the key is derived from the value, instead of passing the value among the communications servers or traffic management devices, the key could be distributed among the devices.

For security purposes, the transmission of the value or the key may be sent in a secure transmission, using PKI or another protocol. Alternatively, instead of encrypting the transmission, the physical communications medium may be secured. For example, if the local backup device resides in a same rack as the active device, the communications channel between the devices may be secured within a locked cabinet to prevent interception of keys.

Implementations of the present disclosure do not rely on any particular value source being used. The value source or sources may include random number generators capable of generating a plurality of random numbers. Alternatively, the value sources may include quasi-random number generators that generate nearly random numbers. Admittedly, a value source that does not generate truly random numbers may exhibit some predictability and, thus, not provide the same level of security as a true random number generator. However, a quasi-random number generator may provide sufficient security for some applications.

In addition, instead of using a number generator, sufficiently unpredictable, variable values may be derived by measuring a varying physical condition. For example, a sufficiently granular and sensitive radiation sensor or other sensor may continually output a varying measurement that proves to be sufficiently random to provide adequate security. Regardless of whether the value is generated or otherwise derived, the value also could be subject to some function or operation that may further randomize or distill the value to present a suitable encryption key.

Also, while examples illustrating implementations of the present disclosure are directed to using SSL protocol for conducting secured communications and transactions, implementations of the present disclosure may be adapted to other protocols in which transient keys or secrets are used to facilitate secured communications.

Exemplary Modes of Handshake Mirroring

Figure 8:
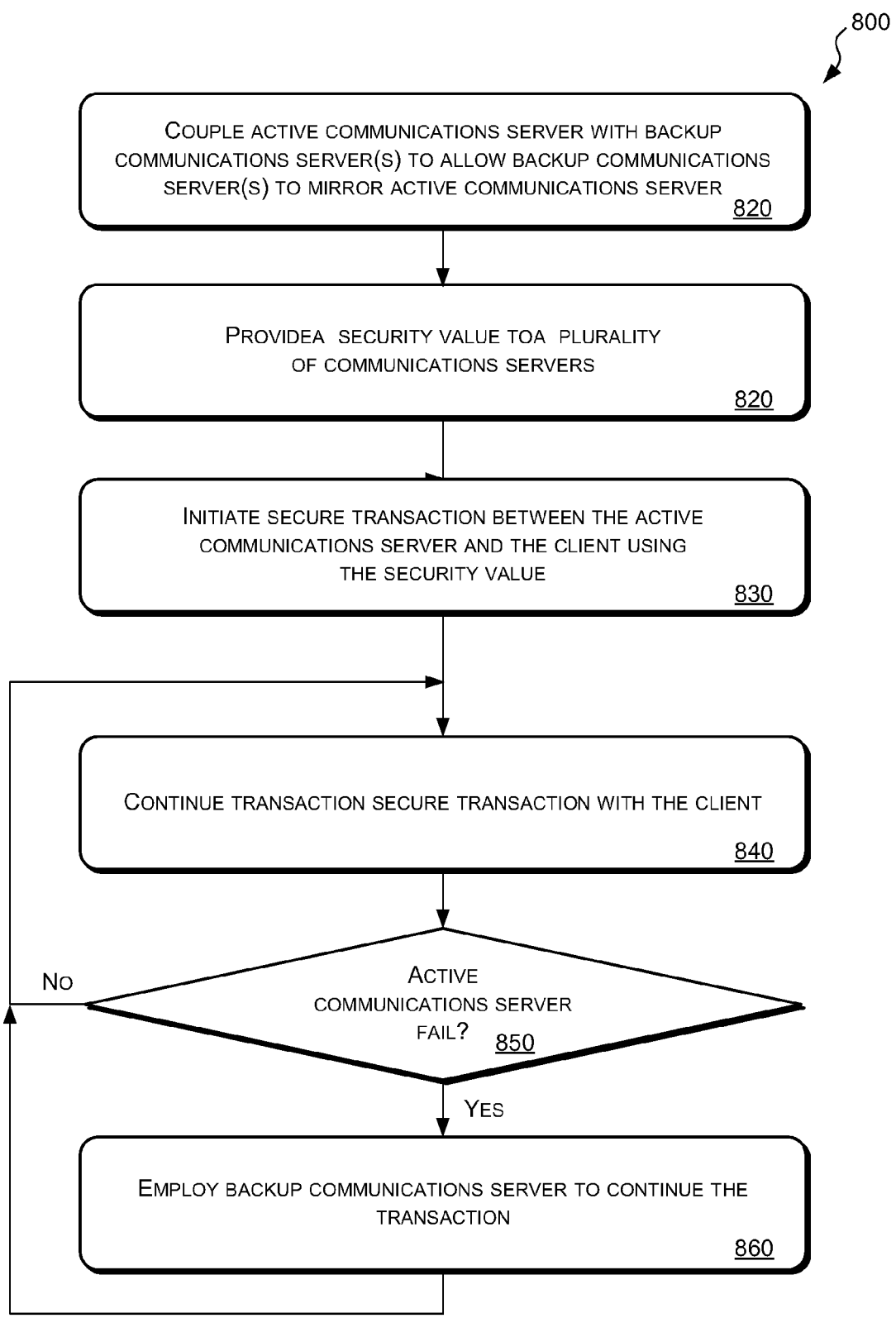
FIG. 8 is a flow diagram of an implementation of handshake mirroring by sharing a security value among communications servers to allow a secure transaction to be continued by a backup communications server when an active communications server has failed.
Figure 9:
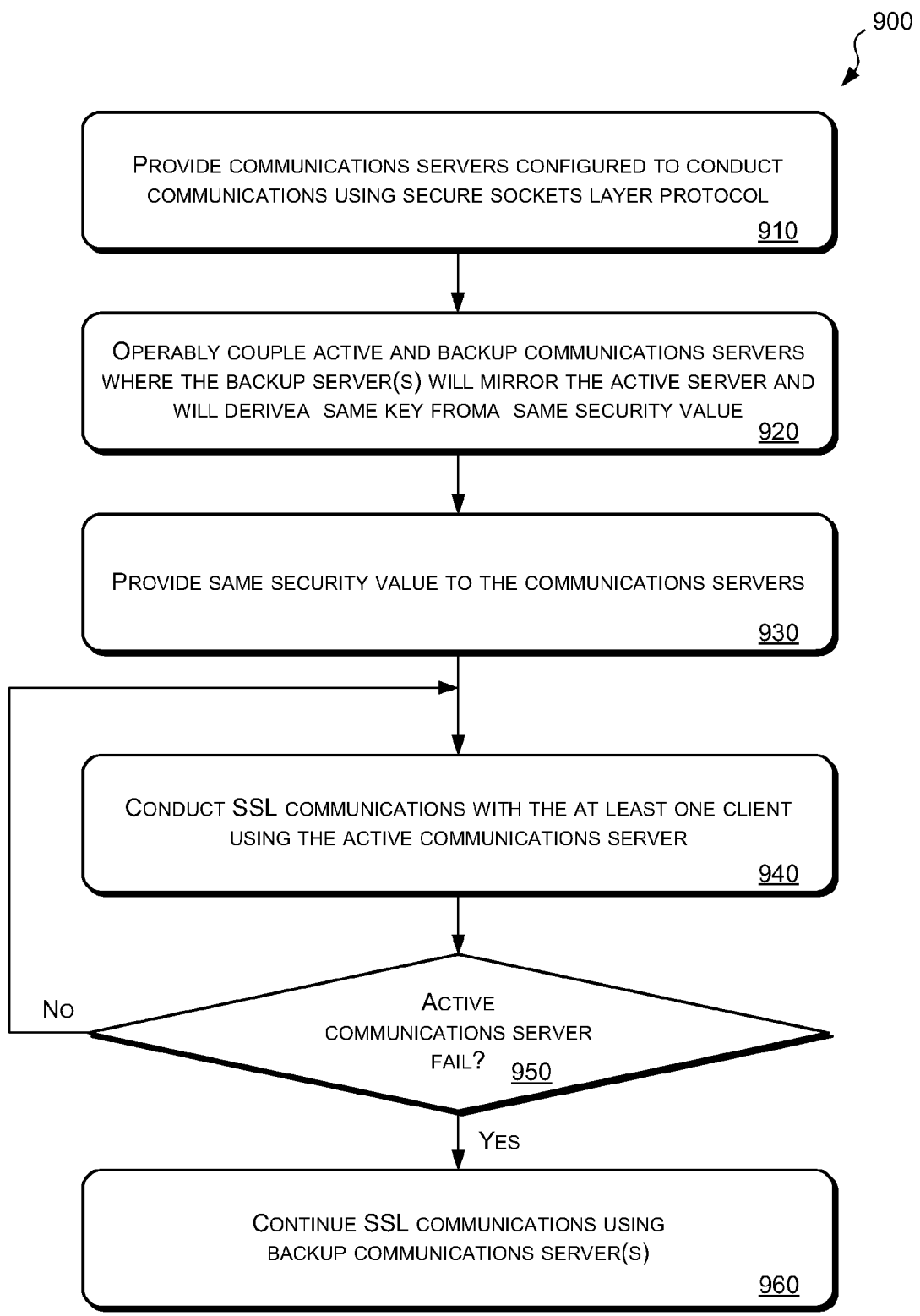
FIG. 9 is a flow diagram of an implementation of secure sockets layer (SSL) handshake mirroring by sharing a security value among communications servers to allow a backup device to continue SSL communications with a client after an active communications server has failed.

FIGS. 8 and 9 illustrate exemplary modes of handshake mirroring to allow a backup communications server or device to continue a secure transaction after an active server or device has failed.

FIG. 8 presents a flow diagram 800 describing one exemplary mode of conducting a secure transaction with a client using handshake mirroring to provide backup for an active traffic management device or other active communications server. At 810, an active communications server is coupled with one or more backup communications servers to allow the backup communications server(s) to mirror the active communications device. At 820, a security value is provided to a plurality of communications servers. As previously described the security value may be used as a key or used to derive a key used in conducting secured or encrypted communications with at least one client. As previously described, providing the security value to the active and backup communications servers allows the backup communications server(s) to mirror not only the operations of the active server, but to also mirror the encryption used by the active server.

At 830, a secure transaction is initiated between the active communications server and the at least one client. The security value is used as the key or the key is derived from the value, and the key is used to secure the communication between the communications server and the client. At 840, the secure transaction with the client is continued. At 850, it is determined whether the active communications server has failed. If not, the flow diagram loops to 840 to continue the secure transaction with the client using the active communications server. On the other hand, if it is determined at 850 that the active communications server has failed, at 860, a backup communications server is employed to continue the transaction. The flow diagram then loops to 840 to continue the secure transaction with the client.

FIG. 9 presents a flow diagram 900 describing another exemplary mode in which SSL handshake mirroring is used to allow for backup of an active communications device. At 910, a plurality of communications servers configured to support communications using SSL protocol. From the plurality of communications server, an active communications server and one or more backup servers will be identified. At 920, the active communications server is coupled with one or more backup communications servers. The backup server or servers are configured to mirror the active communications device and derive a same key from a same security value. Again, the security value may be used as a key or used to derive a key used in conducting secured or encrypted communications with at least one client. At 930, a same security value is provided to the communications servers.

At 940, SSL communications are conducted with the at least one client, at least initially using the active communications server. At 950, it is determined whether the active communications server has failed. If not, the flow diagram loops to 940 to continue the SSL communications transaction with the at least one client using the active communications server. On the other hand, if it is determined at 950 that the active communications server has failed, at 960, the transaction is continued using a backup communications server or servers. Again, as previously described, SSL handshake mirroring allows the backup device or devices to mirror not only the operation of the active device, but also to mirror the encryption used to allow the backup device to continue a SSL transaction even when the active device has failed.

Although exemplary implementations have been described in language specific to structural features and/or methodological acts, it is to be understood that the appended claims are not necessarily limited to the specific features or acts previously described. Rather, the specific features and acts are disclosed as exemplary implementations.

The invention claimed is:

1. An active traffic management apparatus, comprising:
a processor configured to execute program instructions stored in a memory comprising:
obtaining a security value from an internal value source;
deriving a key from the received security value, the deriving comprising extracting at least a portion of the security value for use as the key or applying a function to at least a portion of the security value to generate the key;
conducting encrypted communications in a session with the network device using the derived key derived from the security value, the conducting comprising initiating the encrypted communications with the network device by transmitting the key to the network device in a secure sockets layer (SSL) protocol handshake, conducting the encrypted communications according to the SSL protocol, and transmitting the key to the network device using public key infrastructure (PKI) encryption; and
sharing at least one of the key or the security value with a backup traffic management apparatus configured to mirror the encrypted communications with the network device based on the key and continue to conduct the encrypted communications for the session with the network device using the key when the active traffic management device is unable to conduct the encrypted communications with the network device.

2. The apparatus of claim 1 wherein the network device includes one or more client devices and one or more server devices wherein the active traffic management apparatus and backup traffic management device are interposed between the one or more client devices and one or more server devices and at least one of the one or more server devices is a communications server.

3. A non-transitory computer readable medium having stored thereon instructions for secure network communication mirroring comprising machine executable code which when executed by at least one processor, causes the processor to perform steps comprising:
obtaining a security value from an internal value source;
deriving a key from the received security value, the deriving comprising extracting at least a portion of the security value for use as the key or applying a function to at least a portion of the security value to generate the key;
conducting encrypted communications in a session with the network device using the derived key derived from the security value, the conducting comprising initiating the encrypted communications with the network device by transmitting the key to the network device in a secure sockets layer (SSL) protocol handshake, conducting the encrypted communications according to the SSL protocol, and transmitting the key to the network device using public key infrastructure (PKI) encryption; and
sharing at least one of the key or the security value with a backup traffic management apparatus configured to mirror the encrypted communications with the network device based on the key and continue to conduct the encrypted communications for the session with the network device using the key when the active traffic management device is unable to conduct the encrypted communications with the network device.

4. The medium of claim 3 wherein the network device includes one or more client devices and one or more server devices wherein the active traffic management apparatus and backup traffic management device are interposed between the one or more client devices and one or more server devices and at least one of the one or more server devices is a communications server.

5. A method for secure network communication mirroring, comprising:
obtaining, with an active traffic management device, a security value from an internal value source;
deriving, with the active traffic management device, a key from the received security value, the deriving comprising extracting at least a portion of the security value for use as the key or applying a function to at least a portion of the security value to generate the key;
conducting, with the active traffic management device, encrypted communications in a session with the network device using the derived key derived from the security value, the conducting comprising initiating the encrypted communications with the network device by transmitting the key to the network device in a secure sockets layer (SSL) protocol handshake, conducting the encrypted communications according to the SSL protocol, and transmitting the key to the network device using public key infrastructure (PKI) encryption; and
sharing, with the active traffic management device, at least one of the key or the security value with a backup traffic management apparatus configured to mirror the encrypted communications with the network device based on the key and continue to conduct the encrypted communications for the session with the network device using the key when the active traffic management device is unable to conduct the encrypted communications with the network device.

6. The method of claim 5 wherein the network device includes one or more client devices and one or more server devices wherein the active traffic management apparatus and backup traffic management device are interposed between the one or more client devices and one or more server devices and at least one of the one or more server devices is a communications server.

7. A backup traffic management apparatus, comprising:
a processor configured to execute program instructions stored in a memory comprising:
receiving at least one of a key or a security value used to derive the key, wherein the key is used by an active traffic management device to conduct encrypted communications according to a secure sockets layer (SSL) protocol in a session with the network device and the key is derivable by both the active traffic management apparatus and the backup traffic management device by extracting at least a portion of the security value for use as the key or applying a function to at least a portion of the security value to generate the key;
mirroring the encrypted communications with the network device based on the key; and
continuing to conduct the encrypted communications for the session with the network device using the key when the active traffic management device is unable to conduct the encrypted communications with the network device.

8. The apparatus of claim 7 wherein the network device includes one or more client devices and one or more server devices wherein the active traffic management apparatus and backup traffic management device are interposed between the one or more client devices and one or more server devices and at least one of the one or more server devices is a communications server.

9. The apparatus of claim 7 wherein the receiving at least one of a key or a security value used to derive the key further comprises receiving the security value from one of an external security value generator or the active traffic management device.

10. A non-transitory computer readable medium having stored thereon instructions for secure network communication mirroring comprising machine executable code which when executed by a processor, causes the processor to perform steps comprising:
  receiving at least one of a key or a security value used to derive the key, wherein the key is used by an active traffic management device to conduct encrypted communications according to a secure sockets layer (SSL) protocol in a session with the network device and the key is derivable by both the active traffic management apparatus and the backup traffic management device by extracting at least a portion of the security value for use as the key or applying a function to at least a portion of the security value to generate the key;
  mirroring the encrypted communications with the network device based on the key; and
  continuing to conduct the encrypted communications for the session with the network device using the key when the active traffic management device is unable to conduct the encrypted communications with the network device.

11. The medium of claim 10 wherein the network device includes one or more client devices and one or more server devices wherein the active traffic management apparatus and backup traffic management device are interposed between the one or more client devices and one or more server devices and at least one of the one or more server devices is a communications server.

12. The medium of claim 10 wherein the receiving at least one of a key or a security value used to derive the key further comprises receiving the security value from one of an external security value generator or the active traffic management device.

13. A method for secure network communication mirroring, comprising
  receiving, with a backup traffic management device, at least one of a key or a security value used to derive the key, wherein the key is used by an active traffic management device to conduct encrypted communications according to a secure sockets layer (SSL) protocol in a session with the network device and the key is derivable by both the active traffic management apparatus and the backup traffic management device by extracting at least a portion of the security value for use as the key or applying a function to at least a portion of the security value to generate the key;
  mirroring, with the backup traffic management device, the encrypted communications with the network device based on the key; and
  continuing, with the backup traffic management device, to conduct the encrypted communications for the session with the network device using the key when the active traffic management device is unable to conduct the encrypted communications with the network device.

14. The method of claim 13 wherein the network device includes one or more client devices and one or more server devices wherein the active traffic management apparatus and backup traffic management device are interposed between the one or more client devices and one or more server devices and at least one of the one or more server devices is a communications server.

15. The method of claim 13 wherein the receiving at least one of a key or a security value used to derive the key further comprises receiving the security value from one of an external security value generator or the active traffic management device.

* * * * *

UNITED STATES PATENT AND TRADEMARK OFFICE
CERTIFICATE OF CORRECTION

PATENT NO.        : 8,650,389 B1
APPLICATION NO.   : 12/240940
DATED             : February 11, 2014
INVENTOR(S)       : Peter Thornewell et al.

Page 1 of 1

It is certified that error appears in the above-identified patent and that said Letters Patent is hereby corrected as shown below:

In the Claims

In claim 1, at col. 13, line 15, delete "the" immediately prior to "network device" and insert --a--.

In claim 3, at col. 13, line 50, delete "the" immediately prior to "network device" and insert --a--.

In claim 5, at col. 14, line 16, delete "the" and insert --a--.

In claim 7, at col. 14, line 48, delete "the" immediately prior to "network device" and insert --a--.

In claim 10, at col. 15, line 15, delete "the" immediately prior to "network device" and insert --a--.

In claim 13, at col. 16, line 11, delete "the" immediately prior to "network device" and insert --a--.

Signed and Sealed this
Twenty-first Day of October, 2014

Michelle K. Lee
*Deputy Director of the United States Patent and Trademark Office*